United States Patent [19]

Curtis

[11] 4,031,936

[45] June 28, 1977

[54] PREASSEMBLED SPRING WASHER FASTENER UNIT

[75] Inventor: Gary Martin Curtis, Elgin, Ill.

[73] Assignee: Illinois Tool Works Inc., Chicago, Ill.

[22] Filed: Nov. 14, 1975

[21] Appl. No.: 632,118

[52] U.S. Cl. .............................. 151/37; 85/50 B; 151/40

[51] Int. Cl.² ......................................... F16B 39/24

[58] Field of Search ................. 151/37, 38, 34, 41, 151/35, 39, 40, 42, 19 A; 85/50 B

[56] References Cited

UNITED STATES PATENTS

| | | | |
|---|---|---|---|
| 1,020,178 | 3/1912 | Battin | 151/19 A |
| 2,529,854 | 11/1950 | Tarwater | 151/19 A |
| 2,681,678 | 6/1954 | Hage | 151/37 |
| 3,181,584 | 5/1965 | Borowsky | 151/37 |
| 3,275,055 | 9/1966 | Gutshall | 151/41 X |
| 3,438,416 | 4/1969 | Thurston | 151/37 |
| 3,438,417 | 4/1969 | Albris | 151/37 |
| 3,540,509 | 11/1970 | Gutshall | 151/37 |
| 3,659,491 | 5/1972 | Duffy et al. | 151/38 X |

FOREIGN PATENTS OR APPLICATIONS 358,127   10/1931   United Kingdom ................ 151/42

Primary Examiner—Roy D. Frazier
Assistant Examiner—Rodney H. Bonck
Attorney, Agent, or Firm—Thomas W. Buckman; Robert W. Beart

[57] ABSTRACT

A locking fastener unit including a spring washer preassembled to a rotary fastener member with mounting means having an axis disposed eccentrically to the axis of the thread convolutions so that retrograde motion of these threaded fastener units is resisted both by the spring tension of the washer and by the requirement that the washer must include a translational movement element as the fastener member is rotated in a retrograde direction.

1 Claim, 7 Drawing Figures

U.S. Patent  June 28, 1977  4,031,936
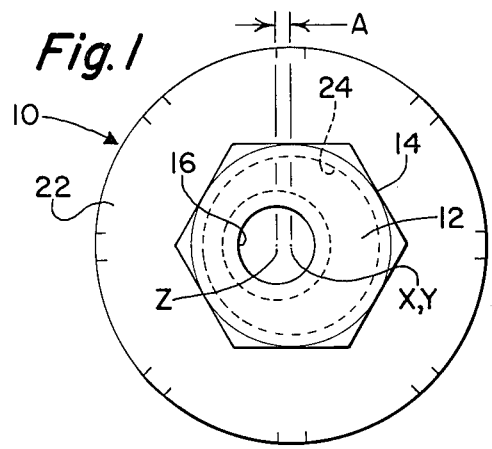
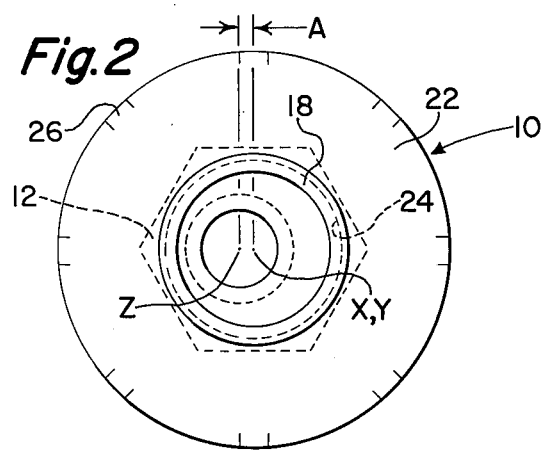
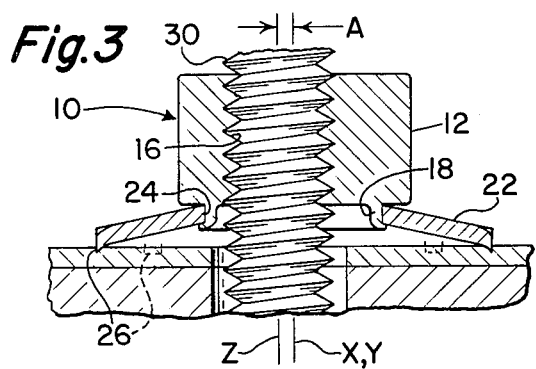
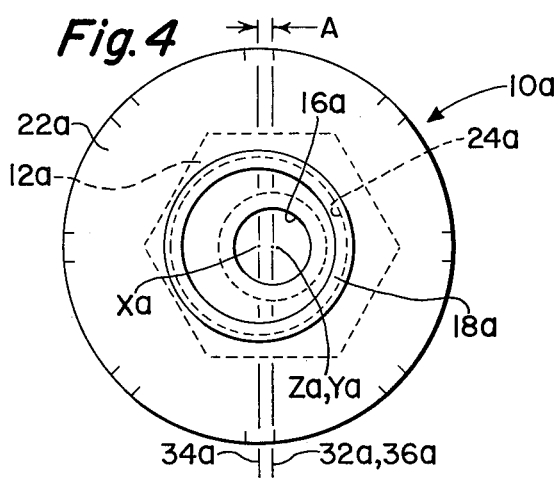
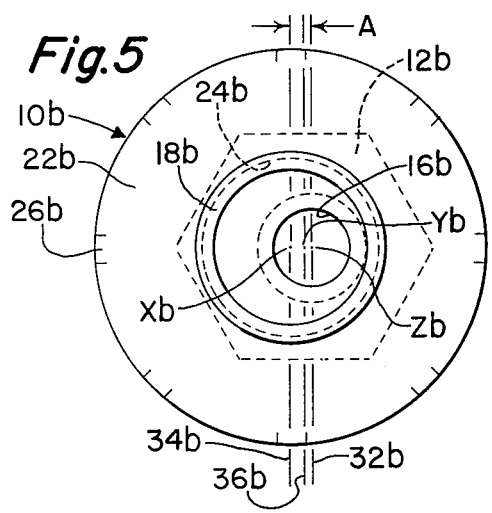
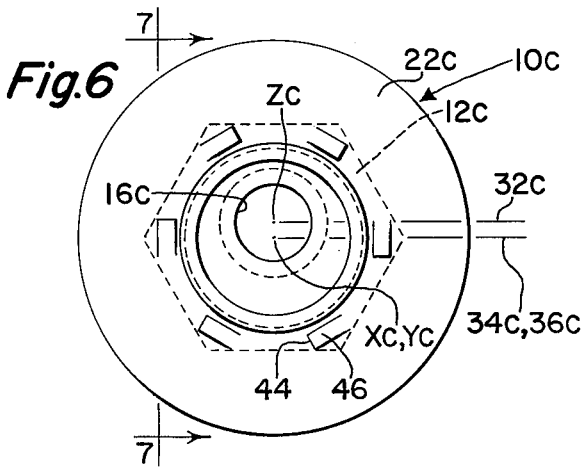
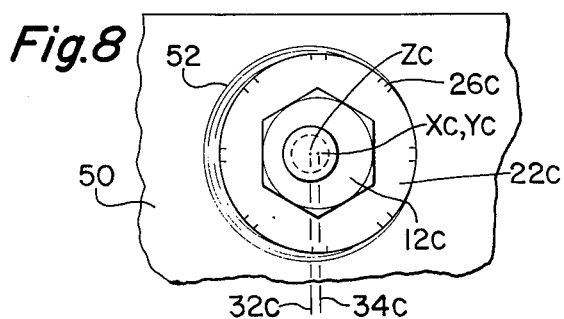
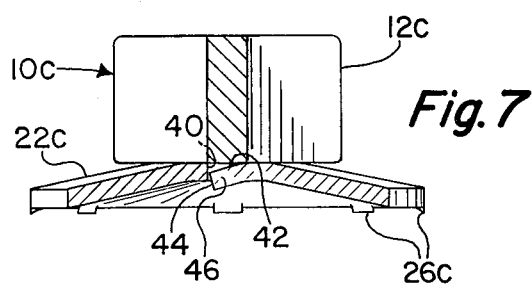

PREASSEMBLED SPRING WASHER FASTENER UNIT

BACKGROUND OF THE INVENTION

This invention relates generally to a fastener unit including an axially compressible spring washer member and more particularly concerns such a unit which has increased effectiveness in resisting retrograde movement of the unit.

Fastener units are currently available which include a spring washer member of a generally dished configuration secured to a bearing surface on either a nut member or a bolt member. The spring washer increases the static friction between the mating thread convolutions upon compression and thus provides resistance to free retrograde motion of the fastener unit. Other prior art units also rely on the biting tooth contact which may be provided on a spring washer member to provide increased resistance to retrograde motion of the fastener unit.

However, there are certain environments which inherently include high vibrations or other elements tending to loosen the tension in the joint. It is accordingly an object of the present invention to provide a fastener unit which has increased resistance to unauthorized retrograde motion of the fastener unit.

It is a more specific object of the invention to provide a nut and spring washer preassembled unit which requires that the washer be moved in a translational direction in order for the nut member to be loosened.

Another object of the invention is to provide a spring locking unit which will provide a visual indication that the unit has been tightened to a predetermined amount.

In addition to the foregoing objects and advantages, it should be understood that the present invention contemplates the provision of a rotary fastener member, such as a nut, which is provided with a threaded bore and a generally annular shank extending a short distance from one clamping surface upon which a dish shaped spring washer is mounted in a preassembled fashion. The axis of the threaded bore is displaced laterally from the axis of the annular mounting shank so that as the nut member is rotated about the threaded bore axis a crank arm is produced forcing the washer member to include at least an element of translational movement over the associated workpiece. This element of translational movement increases the frictional force which must be overcome if the rotary fastener member is to move in a retrograde direction. This translational movement friction, coupled with the spring tension and perhaps biting teeth in the outer periphery of the washer provides a unit with greatly increased locking efficiency.

The foregoing and other objects and advantages will be more apparent from the following detailed description when considered in connection with the accompanying drawings wherein:

FIG. 1 is a top plan view of one embodiment of the fastener unit.

FIG. 2 is a bottom plan view of the fastener unit of FIG. 1.

FIG. 3 is an axial sectional view through a unit such as shown in FIG. 1 associated with a threaded shank member.

FIG. 4 is a bottom plan view of a modified form of the invention.

FIG. 5 is a bottom plan view of yet another modification of the invention.

FIG. 6 is a bottom plan view of still another modification of the invention.

FIG. 7 is a sectional view taken through lines 7—7 of the embodiment of FIG. 6.

FIG. 8 is a top plan view of the embodiment shown in FIGS. 6 and 7 after it has been clamped to a predetermined tension on a workpiece surface.

Referring now to the drawings more in detail wherein like numerals have been employed to designate similar parts throughout the various figures, it will be noted that FIG. 1 illustrates the two elements or parts that form the structure of one embodiment of the invention. The fastener unit 10 will include a dished or conical type resilient sheet metal washer designated generally by the numeral 22 and a complementary threaded fastener member, such as nut 12. Dished or conical type washers of the type described are well known and provide axial flexing or stressing to afford resistance to the loosening of a screw nut member tightening thereagainst. Such resistance to loosening occurs as a result of the increased static friction presented between the mating thread convolutions. The present invention is concerned with an improvement of a locking unit of this general class.

In views 1–3, it will be noted that washer member 22 is secured in a preassembled fashion to the clamping face of nut member 12 through the provision of an annular stub shank 18. In accordance with conventional preassembly techniques, the washer is positioned adjacent the clamping surface of the nut so that the inner periphery forming aperture 24 is positioned about the attachment flange of stub shank 18. Thereafter, the terminal portion of the flange may be radially expanded to retain the washer beneath the nut. It should be understood that other mounting means including an annular mounting surface could be utilized and still come wihin the meaning and scope of this invention.

In the embodiment shown in FIGS. 1–3, the central axis $z$ of the threaded bore 16 formed in the nut is laterally offset or eccentrically disposed a distance A relative to the axes $x$ and $y$ of the mounting shank 18 and nut body respectively. As a result of this offset condition, the rotation of the nut member about the axis of the bore 16 forces the attachment flange 18 to act as a crank arm relative to the washer 22. Rotation of the nut in either direction will cause the washer to include an element of translational motion relative to a workpiece during the rotation of the nut. This translational motion becomes most important as a means to prevent unauthorized retrograde motion of the nut once it has been torqued down or clamped against a workpiece. It should be apparent that the nut must overcome the spring tension of the member 22 in addition to overcoming the frictional force presented as the washer member 22 is forced to move across the workpiece in a translational manner. The locking efficiency of such a unit can be further enhanced throught the provision of biting teeth 26 at the outer periphery of the washer.

In FIG. 4 a modified form of the present invention is disclosed. Locking unit 10a again includes a dished spring washer 22a and nut member 12a with a bore 16a formed therethrough. However, it will be noted that the stub shank 18a is positioned so that its axis $x_a$ is offset from the central axis $z_a$ of the aperture 16a. In the embodiment, the axis of the nut $y_a$ is coincident with the axis of the hole 16a. The crank arm A is thus formed by offsetting the mounting shank and thus a generally conventional nut body can be utilized.

FIG. 5 shows an embodiment wherein the crank arm or offset between the axis of rotation and the axis of the mounting means may be maximized. Fastener unit 10b again shows the axis $x_b$ of the mounting flange 18b being offset or eccentrically disposed to the axis $z_b$ of the hole of the threaded bore 16b. However, the crank arm A is maximized by offsetting each axis $x_b$ and $z_b$ on opposing sides of the axis $y_b$ of the nut body. Such a configuration will force the washer member 22b to move in a translational manner across the work surface for a relatively large distance thus increasing the frictional force to be overcome.

The unit 10a described in FIGS. 6–8 described yet another embodiment which is substantially similar in every respect to the units 10, 10a and 10b except that the inner peripheral margin of the washer 22c is provided with indentions or impressions which include an abrupt leading or driving surface 44 and a camming trailing surface 46. The associated bearing surface of the nut is provided with complementary locking teeth or protuberances which include a leading, driving surface 40 and a trailing camming surface 42. As the unit 10c is tightened in the conventional turning direction, the abutments and recesses act to rotate the washer 12c about the axis $z_c$ rather allowing the washer to rotate relative to the nut as the prior embodiments so permit.

The cooperating abutting surfaces 44 and 42 will force the washer 22c to rotate with the member 12c only in the on direction. As such a unit is tightened against a workpiece 50, each tooth 26c will scribe an arc concentric about the axis $z_c$ of the threaded bore 16c. Thus, a series of visibly perceptible scribes 52 will be formed on the surface of the workpiece. Where such scribes are not undesirable, this unit 10c will thus provide a visual indication to an observer or operator that the unit 10c has been tightened to a certain tension on the workpiece. Unauthorized retrograde motion of the nut member 12c is restricted since the nut must overcome the static friction on the threads as a result of the spring tension of the washer 22c and any movement of the nut member relative to the washer member causes the camming surfaces 42 and 46 to move relative to one another. This in turn increases the compression of the washer member thus further enhancing the resistance to rotation. However, in addition to these features, the rotation of the nut member 12c will force the washer to move in a translational direction across the surface of the workpiece as a result of the crank arm described relative to the other embodiments of the invention. This increased frictional retardation force greatly contributes to the locking efficiency of the unit thus described.

It should be apparent that the resistance to loosening characterized by this invention can further be enhanced by the use of locking teeth which include a leading camming surface and a trailing locking surface on the bearing surface of the nut. Such a configuration serves to resist rotation in the off direction of the nut relative to the washer and thus provides a further locking feature in addition to the principle features of the invention.

While the invention has been described with reference to a nuttype rotary fastener unit, it should be understood that the invention can be incorporated in a rotary fastener unit incorporating a bolt head and shank with an appropriate annular mounting means associated with the clamping surface of the bolt head and still come within the teachings of this invention.

From the foregoing, it will be apparent that the present invention contemplates an improved fastening device which increases the locking efficiency of a dished or conical shaped spring washer. The structural features embodied in the offsetting of the axes of the threaded bore and the mounting means function in a new and unobvious manner to produce results heretofore not attainable by locking devices of conventional design. Obviously, the invention is not limited to the specific structure of details disclosed and described herein, but contemplates other changes and modifications without departing from the spirit and scope of the depending claims.

I claim:

1. A preassembled locking fastener unit inlcuding a nut member with a threaded bore formed therein, a compressible, generally conical spring washer with a substantially circular outer periphery and substantially circular, uninterrupted inner periphery formed by an aperture therein, the outer periphery being concentric with the uninterrupted inner periphery, a generally annular means formed on the clamping surface of the nut with a central axis offset laterally from the central axis of the threaded bore of the nut, the outer periphery of the washer member including locking teeth means to retard free movement of the washer relative to a work surface when associated therewith, the clamping surface of the nut further including a plurality of teeth integral therewith and spaced circumferentially about the axis of the threaded bore and positioned to overlie the inner marginal surface of the washer member, each tooth including a locking surface extending substantially perpendicular to the clamping surface of the nut and a camming surface, the associated inner marginal surface of the washer including locking recesses including camming surfaces and locking surfaces complementary to the camming and locking surfaces of the teeth on the clamping surface of the nut wherein the substantially perpendicular surfaces are forward when the nut member is rotated in a tightening direction to urge the washer to rotate therewith in said tightening direction creating visible scribe marks in the workpiece, while the camming surfaces allow relative rotation between the washer and nut when the nut is rotated in an untightening direction but in such a manner that the washer is forced to move laterally across the workpiece thereby resisting unauthorized loosening of the joint formed thereby.

* * * * *